Sept. 25, 1962
V. C. TYRRELL
3,055,115
FILING GAUGE FOR SAW CHAIN
Filed Feb. 2, 1960
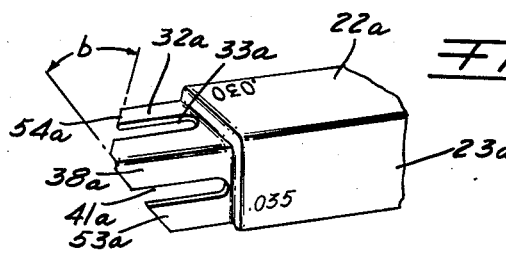
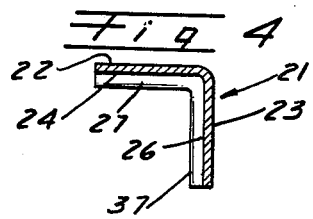
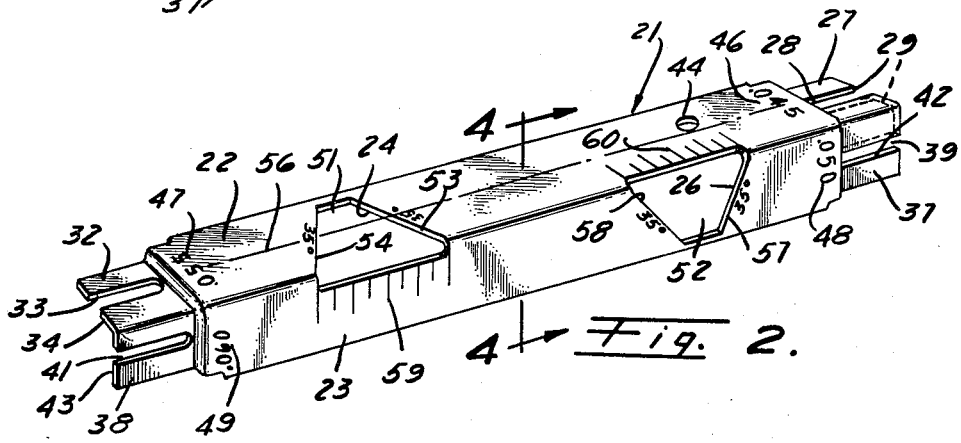
Vincent C. Tyrrell,
INVENTOR.
WHANN & McMANIGAL
Attorneys for Applicant
by United States Patent Office 3,055,115
Patented Sept. 25, 1962

3,055,115
FILING GAUGE FOR SAW CHAIN
Vincent C. Tyrrell, Torrance, Calif., assignor to McCulloch Corporation, Los Angeles, Calif., a corporation of Wisconsin
Filed Feb. 2, 1960, Ser. No. 6,195
4 Claims. (Cl. 33—202)

The present invention relates to a filing gauge and more particularly to a filing gauge for use in adjusting the clearance of the depth gauge of a saw chain tooth and in gauging the file angle of a saw chain cutter tooth.

Improper filing of a saw chain can ruin it. The original angles of the cutter teeth should be followed and the lengths of these teeth should be kept equal. The original top plate angle of a cutter tooth generally is 35°. If this angle is made less than the original 35° the cutter tooth will be blunt and cutting will be slow. If, on the other hand, the angle is made greater than the original 35°, the cutter tooth will be feathered and will dull too quickly. Saw chains are used to cut a variety of different types of wood. The gauge in cutting soft wood is lower than the gauge needed for cutting hard wood. A satisfactory depth gauge should, therefore, contain a plurality of settings for cutting a variety of different types of wood.

Accordingly, it is an important object of my invention to provide a filing gauge for saw chains which will assist in rapidly and conveniently maintaining the depth gauge of the cutter tooth for a variety of cutting conditions.

Accordingly, it is an important object of my invention to provide a filing gauge for saw chains which will assist in maintaining the original top plate angle of the cutter teeth of the saw chain.

Another object of my invention is to provide such a filing gauge which will enable the file operator to maintain a proper tooth length in the cutter teeth of the saw chain.

A further object is to provide a filing gauge containing a plurality of settings for conveniently adjusting the depth gauge of the saw chain teeth to efficiently cut any of a variety of a plurality of different types of wood.

Additional objects of my invention will become apparent from the following description which is given primarily for purposes of illustration and not limitation.

Briefly stated, in general terms, the objects of my invention are attained by providing a filing gauge for saw chains having two elongate planar members which help to form the body of the filing gauge and also provide two planar reference surfaces for adjusting the clearance of the depth gauge of the saw chain teeth. A filing shoe is formed on each end of each of the two elongate planar members; thus making a total of four filing shoes. Each filing shoe has an aperture formed therein for receiving a depth gauge of a saw chain tooth and each shoe has a planar gauge surface set at a different spaced parallel relationship relative to a corresponding planar reference surface of one of the two planar members so that the filing gauge can be used to adjust the depth gauge of the saw chain teeth to any one of four different settings. Each of the two elongate planar members also has a top plate angle aperture formed therein which is provided with a straight edge formed at an angle of about 35° to the longitudinal center line of the planar member for gauging a file angle to coincide with the top plate angle of the saw chain cutter teeth when the filing gauge is used on the saw chain. In addition, each of the apertures is provided with a linear scale for gauging the length of the saw chain cutter teeth.

A more detailed description of my invention is given below with reference to the accompanying drawing, wherein:

FIG. 1 is a side elevational view showing a filing gauge of my invention mounted on a saw chain for adjusting the clearance of the depth gauge of the saw chain teeth and/or for gauging the file angle of the cutter teeth;
FIG. 2 is a perspective view of the filing gauge illustrated in FIG. 1;
FIG. 3 is an end view of FIG. 2 looking at the left end thereof;
FIG. 4 is a cross sectional view taken at a point indicated by the arrows 4—4 of FIG. 2; and
FIG. 5 is a perspective view of one end of an alternative form of filing gauge of my invention.

The filing gauge of my invention is shown in connection with a saw chain comprising a plurality of centrally disposed sprocket engaging links 8 pivotally joined together by pairs of oppositely disposed side plates 9 and 10. Side plates 9 are identical to each other, whereas side plates 10 comprise cutter links or elements and are formed with a blade portion 11 extending at right angles to the longitudinal plane of the chain. The leading edge of each of the blade portions 11 is provided with a kerf bottom cutting edge 12, and it will be seen from FIG. 1 that from the cutting edge the blade portions recede or slope downwardly toward a line through the rivets 16 connecting the links 8 and side plates 9 and 10. For convenience, the cutting edge 12 and blade portions of side plates 10 are referred to herein as saw chain cutter teeth. Also formed on each of the cutter links 10 is a depth gauge 17, the terminus or surface 18 of which is adapted to ride on the bottom of the kerf to regulate the depth of the cut made by the respective tooth. Again for convenience, the depth gauges 17 are referred to herein as depth gauges of saw chain teeth. The clearance between the depth gauge terminus 18 and cutting edge 12 of a tooth is indicated at 19. As shown, alternate cutter elements 10 are of right and left configuration.

The filing gauge of my invention, as shown in the specific embodiment FIGS. 1 and 2 of the drawings, is formed of a single piece of blanked sheet metal in a one-shot operation. The body 21 of the filing gauge consists of two elongate planar members 22 and 23 connected integrally at adjacent sides thereof at substantially right angles. Elongate planar member 22 has a flat reference surface 24 on the inner side thereof for engaging cutting edges 12 of cutter teeth 10, extending longitudinally of the body 21 for a distance at least as great as the spacing between a pair of successive cutter teeth. The filing gauge is adapted to be mounted upon a length of straightened saw chain with the reference surface 24 engaging the cutting edges 12 of a pair of successive cutter teeth 10, as shown in FIG. 1. Similarly, elongate planar member 23 has a flat reference surface 26 on the inner side thereof for engaging cutting edges 12 of a pair of successive cutter teeth 10 when the filing gauge is mounted upon a length of saw chain with planar member 23 horizontally on the teeth of the chain.

An end portion of planar member 22 is stepped downwardly with respect to the inner flat reference surface 24 to define a filing shoe 27 provided with an aperture or slot 28. The slot 28 is adapted to receive therethrough the depth gauge 17 of the forwardly positioned cutter tooth 10, with the surface 18 extending up through the slot of a pair of cutter teeth with which the surface 24 is in engagement. The upper surface of the filing shoe 27, as the filing gauge is shown in FIG. 1, defines a planar reference surface 29 which is substantially parallel to the plane of reference surface 24 and spaced therebelow by a distance 31 equal to the desired depth gauge clearance 19, which may be, for example, 0.045 inch. After the filing gauge has been positioned, as indicated above, the depth gauge 17 of a tooth 10, can be filed to the proper clearance by filing off the surface portion 18 which projects above the surface of the filing shoe 27 with a suitable hand file. The filing shoe 27 should be surface hardened to resist wear during the filing of the depth gauge 17.

The other end portion of planar member 22 also is stepped downwardly with respect to the inner flat reference surface 24 to define a filing shoe 32 provided with a slot 33 adapted to receive therethrough a depth gauge 17 of a cutter tooth 10 as described above in connection with filing shoe 27. The planar reference surface 34 of filing shoe 32 also is in spaced parallel relationship with reference surface 24 and spaced therebelow a distance 36 equal to, for example 0.055 inch. Similarly, planar member 23 is provided at each end thereof with filing shoes 37 and 38, respectively, provided with slots 39 and 41, respectively, and planar reference surfaces 42 and 43, respectively. Planar reference surface 42 of filing shoe 37 is in spaced parallel relationship with the inner flat reference surface 26 of planar member 23 and spaced therebelow a distance 0.050 inch, for example, while planar reference surface 43 of filing shoe 38 is in spaced parallel relationship with the inner flat reference surface 26 and spaced therebelow a distance 0.060 inch, for example.

By using the filing gauge of my invention, a chain saw operator can very conveniently select any of several sizes of saw chain in accordance with the type of wood or cutting operation to be performed and, with a single handy and compact filing gauge, determine the proper setting to which the depth gauge of the teeth of the selected saw chain should be filed. To facilitate identifying the proper filing shoe, identifying numerals 46, 47, 48 and 49 are stamped adjacent a corresponding end of the filing gauge and planar member to indicate the clearance of the respective filing shoe surface. An opening 44 is provided through one of the planar members so that the filing gauge can be hung on a nail or hook.

Each planar member 22 and 23 is provided with a top plate angle aperture 51 and 52, respectively formed therethrough. Each aperture 51 and 52 is positioned adjacent one end of a respective planar member so that when a filing shoe of the member is in position with a depth gauge 17 of a tooth 10 extending therethrough, a cutting edge 12 of the same tooth 10 can be made to extend through the respective aperture 51 or 52 by sliding the filing gauge forwardly or readwardly a short distance. Each of the top plate angle apertures 51 and 52 is symmetrical trapezoidal in shape with the parallel sides thereof parallel to the saw chain and to the sides of planar members 22 and 23, and the other two nonparallel sides at an angle of about 35° to the saw chain and to the sides of the planar members or to the longitudinal center lines of the respective planar members.

Referring to top plate angle aperture 51, for example, the straight sides or file guiding surfaces 53 and 54 are the sides formed at an angle of about 35° to the center line 56 of planar member 22. Side 53, for example, serves as a straight edge gauge for guiding the alignment of a hand file to maintain the top angle of a cutting edge 12 of a tooth 10 while sharpening the cutting edge. Similarly, side 54 serves as a straight edge gauge to guide the alignment of a hand file to maintain the top angle of a cutting edge 12 of a successive, adjacent tooth 10 wherein the top angle of that cutting edge is about 35° to the other side of a line at right angles to the length of the chain saw and to center line 56. Top plate angle aperture 52 is similarly formed through, and oriented in, planar member 23 so that the sides 57 and 58 thereof will serve as straight edge gauges, as described above, when planar member 23 is in position horizontally above the teeth of the saw chain with a depth gauge 17 projecting through a slot of a filing shoe.

Thus, by using the filing gauge of my invention, a chain saw operator can very conveniently sharpen the cutting edges of the cutting teeth of the saw at the same time that he adjusts the clearance of the depth gauge of the same teeth, and with a single, compact filing gauge. In addition, each top plate angle aperture 51 and 52 is provided with a linear scale 59 and 60, respectively, along the inner parallel side of the symmetrical trapezoidal aperture so that the length of each cutting edge 12 of each tooth 10 can be checked and equalized at the same time that the cutting edges 12 are being sharpened. Thus the filing gauge of my invention serves three separate and distinct functions as the result of combining several structures for the first time in a single, one-piece filing gauge.

In FIG. 5 I show a form of my invention in which parts similar to the parts of the filing gauge shown in FIGS. 1 to 4 have the same numbers followed by a small letter $a$. In this form of my invention, the apertures 51 and 52 are eliminated and the end walls of the filing shoes 32$a$ and 38$a$ are formed with angular walls or file guiding surfaces 54$a$ and 53$a$ respectively, these end walls being formed at angles such as indicated at $b$ in FIG. 5 which in the form illustrated is approximately 35° from a transverse plane through the chain gauge.

The end walls of filing shoes 27$a$ and 37$a$ at the opposite end of the gauge (not shown) are also sloped at an angle so that such end faces likewise may be used for determining the proper filing angularity of the cutting edge of the saw teeth.

I claim:
1. A filing gauge for saw chains comprising an elongate body having two, mutually perpendicular, elongate body portions, each of said body portions including: an elongate planar member forming a planar reference surface to engage cutting edges of a pair of successive cutter teeth of a saw chain; a filing shoe formed at each end of said elongate planar member, an aperture formed in each of the filing shoes for receiving a depth gauge of a saw chain tooth through the aperture when said reference surface engages cutting edges of a pair of successive cutter teeth, and a planar gauge surface on each of the filing shoes on the opposite side of the elongate body portion relative to the planar reference surface, said gauge surfaces being parallel to and spaced from the plane of said reference surface a predetermined distance; and two, spaced, file guiding surfaces transverse to and extending through each of said body portions, each said surface being inclined to the longitudinal axis of its respective body portion at an angle corresponding to a desired top plate angle of a saw chain cutter tooth, with there being sufficient space laterally adjacent each said surface to enable file means to engage and file the cutting edge of a cutter tooth at said desired top plate angle while being guided by a said file guiding surface, said two surfaces being oppositely inclined to provide file guiding means for the oppositely inclined cutting edges of adjacent saw chain cutter teeth.

2. A filing gauge, as described in claim 1, wherein, in each said body portion, the two spaced file guiding surfaces extending therethrough comprise the opposite sides of an aperture formed in the elongate planar member thereof, with said sides being inclined to the body portion longitudinal axis at an angle of about 35°.

3. A filing gauge, as described in claim 2, wherein each aperture formed in each elongate planar member has a scale along one side thereof, parallel to the longitudinal axis of the elongate body portion on which it is positioned.

4. A filing gauge, as described in claim 1, wherein, in each said body portion, each file guiding surface comprises an end wall of one of said filing shoes, with each end wall being inclined to the body portion longitudinal axis at an angle of about 35°.

References Cited in the file of this patent
UNITED STATES PATENTS

| | | |
|---|---|---|
| 209,399 | Hurlburt | Oct. 29, 1878 |
| 2,705,376 | Cox | Apr. 5, 1955 |
| 2,823,461 | Schneider | Feb. 18, 1958 |
| 2,901,834 | Miller | Sept. 1, 1959 |